United States Patent
Miyazaki

(10) Patent No.: US 9,254,715 B2
(45) Date of Patent: Feb. 9, 2016

(54) INNER LINER RUBBER COMPOSITION AND PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 91 days.

(21) Appl. No.: 14/062,253

(22) Filed: Oct. 24, 2013

(65) Prior Publication Data

US 2014/0116594 A1    May 1, 2014

(30) Foreign Application Priority Data

Oct. 25, 2012  (JP) ................................. 2012-235842

(51) Int. Cl.
  *C08L 47/00* (2006.01)
  *C08L 17/00* (2006.01)
  *B60C 1/00* (2006.01)

(52) U.S. Cl.
  CPC ............. *B60C 1/0008* (2013.04); *Y02T 10/862* (2013.01)

(58) Field of Classification Search
  CPC ....... C08L 47/00; C08L 17/00; B60C 1/0008; Y02T 10/862
  USPC .............................. 152/510; 524/65, 432, 186
  See application file for complete search history.

(56) References Cited

U.S. PATENT DOCUMENTS

| | | | | |
|---|---|---|---|---|
| 2010/0170606 A1* | 7/2010 | Taguchi | ......................... | 152/510 |
| 2010/0249278 A1* | 9/2010 | Miyazaki | ...................... | 523/438 |
| 2010/0331473 A1 | 12/2010 | Miyazaki | | |

FOREIGN PATENT DOCUMENTS

| | | |
|---|---|---|
| JP | 61-176648 A | 8/1986 |
| JP | 5-43755 A | 2/1993 |
| JP | 2007-320992 A | 12/2007 |
| JP | 2009-24100 A | 2/2009 |
| JP | 2009-24119 A | 2/2009 |
| JP | 4550763 B2 | 9/2010 |
| JP | 2013-23675 A | 2/2013 |
| WO | WO 2009/044652 A1 | 4/2009 |

\* cited by examiner

*Primary Examiner* — Susannah Chung
*Assistant Examiner* — Josephine Chang
(74) *Attorney, Agent, or Firm* — Birch Stewart Kolasch & Birch, LLP

(57) ABSTRACT

Inner liner rubber composition for a pneumatic tire, which enables improvements in handling stability, fuel economy, elongation at break, sheet processability, air barrier properties, and compounding cost in a balanced manner. Also, pneumatic tire including inner liner formed from the rubber composition. The rubber composition includes: reclaimed butyl rubber; halogenated butyl rubber other than the reclaimed butyl rubber; at least one semi-reinforcing filler selected from finely ground bituminous coal having a specified average particle size, talc, mica, and hard clay; and carbon black having a specific $N_2SA$ and/or silica having a specific $N_2SA$. The rubber composition has a predetermined reclaimed butyl rubber content, a predetermined combined content of the reclaimed butyl rubber and the halogenated butyl rubber, a predetermined total semi-reinforcing filler content, and a predetermined combined content of the carbon black and the silica.

8 Claims, No Drawings

INNER LINER RUBBER COMPOSITION AND PNEUMATIC TIRE

TECHNICAL FIELD

The present invention relates to an inner liner rubber composition and a pneumatic tire formed from the same.

BACKGROUND ART

The fuel efficiency of automobiles has been conventionally improved by reducing the rolling resistance of tires (in other words, by improving the performance in terms of rolling resistance). As automobiles have been required to have still more improved fuel economy recently, rubber compositions for tire components have been required to be excellent in low heat build-up. Therefore, rubber compositions with a low tan δ and low heat build-up have begun to be used in, for example, the tread portion or the sidewall portion.

Meanwhile, in the inner liner portion inside a tire, butyl rubbers with low air permeability are generally used in order to retain air. These butyl rubbers, however, have higher hysteresis losses than those of diene rubbers used in the tread portion and the sidewall portion. Thus, it is difficult to readily prepare an inner liner rubber composition with a low tan δ.

The tan δ of an inner liner rubber composition can be lowered by reducing the amount of carbon black; however, the viscosity of the unvulcanized rubber composition is then reduced correspondingly, leading to difficulty in controlling the rubber thickness in the molding process, which means deteriorated sheet processability. In this context, Patent Literature 1 discloses that the balance between the reduction in tan δ and the retention of sheet processability can be improved by partially replacing carbon black with finely ground bituminous coal. Meanwhile, Patent Literature 2 discloses that the moisture barrier properties of tires are improved by using in an insulation a rubber composition that includes a rubber component containing a large amount of natural rubber in combination with finely ground bituminous coal. However, Patent Literatures 1 and 2 still leave room for improvement in improving handling stability, fuel economy, elongation at break, sheet processability, air barrier properties, and compounding cost in a balanced manner.

CITATION LIST

Patent Literature

Patent Literature 1: JP H05-43755 A
Patent Literature 2: JP 4550763 B

SUMMARY OF INVENTION

Technical Problem

The present invention aims to solve the above problems and provide an inner liner rubber composition that enables improvements in handling stability, fuel economy, elongation at break, sheet processability, air barrier properties, and compounding cost in a balanced manner; and a pneumatic tire including an inner liner formed from the inner liner rubber composition.

Solution to Problem

The claimed invention relates to an inner liner rubber composition, including: a rubber component containing a reclaimed butyl rubber and a halogenated butyl rubber other than the reclaimed butyl rubber; at least one semi-reinforcing filler selected from the group consisting of finely ground bituminous coal, talc, mica, and hard clay; and at least one of a carbon black having a nitrogen adsorption specific surface area of 20 to 35 $m^2/g$ and a silica having a nitrogen adsorption specific surface area of 40 to 120 $m^2/g$, wherein the finely ground bituminous coal has an average particle size of 50 μm or less, the inner liner rubber composition has a reclaimed butyl rubber content of 5 to 30 mass % and a combined content of the reclaimed butyl rubber and the halogenated butyl rubber of 70 to 100 mass %, each based on 100 mass % of the rubber component, and the inner liner rubber composition has a total semi-reinforcing filler content of 3 to 45 parts by mass and a combined content of the carbon black and the silica of 20 to 60 parts by mass, each per 100 parts by mass of the rubber component.

The rubber composition preferably includes, per 100 parts by mass of the rubber component: 1 to 20 parts by mass of a mixed resin and 0.8 to 2.9 parts by mass of zinc oxide.

The rubber composition preferably has a phenylenediamine antioxidant content of 0.5 parts by mass or less per 100 parts by mass of the rubber component.

The rubber composition preferably has a tan δ at 70° C. of 0.20 or lower.

The rubber composition preferably includes, per 100 parts by mass of the rubber component, 0.1 to 3 parts by mass of an alkylphenol-sulfur chloride condensate represented by the following formula (1):

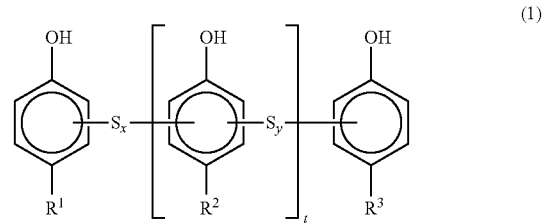

wherein $R^1$, $R^2$ and $R^3$ are the same as or different from one another and each represent a C5 to C12 alkyl group; x and y are the same as or different from each other and each represent an integer of 1 to 3; and t represents an integer of 0 to 250.

The claimed invention also relates to a pneumatic tire, including an inner liner formed from the rubber composition.

Advantageous Effects of Invention

The present invention provides an inner liner rubber composition including predetermined amounts of a reclaimed butyl rubber, a halogenated butyl rubber, a specific semi-reinforcing filler, and a specific carbon black and/or a specific silica. Accordingly, the use of the rubber composition in a tire inner liner enables the production of a pneumatic tire that is improved in handling stability, fuel economy, elongation at break, sheet processability, air barrier properties, and compounding cost in a balanced manner.

DESCRIPTION OF EMBODIMENTS

The inner liner rubber composition of the present invention contains predetermined amounts of a reclaimed butyl rubber, a halogenated butyl rubber, a specific semi-reinforcing filler, and a specific carbon black and/or a specific silica.

The reclaimed butyl rubber used in the present invention refers to the butyl rubber fraction included in ground particles of a rubber product that contains a large amount of butyl rubber(s), such as a tire tube or a bladder used in the production of tires, or the butyl rubber fraction included in a product obtained by heating/pressuring the ground particles, and encompasses a revulcanizable rubber obtained by decomposition of crosslinking bonds (devulcanization) of the rubber component. In general, about 50 mass % of the ground particles corresponds to the reclaimed butyl rubber. The reclaimed butyl rubber contains sulfur as well, but the sulfur is deactivated so as not to be involved in crosslinking.

Examples of commercial products of the reclaimed butyl rubber include a rubber reclaim from tubes produced by Muraoka Rubber Reclaiming Co., Ltd. and a rubber reclaim from bladders produced by Car Quest Co., Ltd. The rubber reclaim from tubes of Muraoka Rubber Reclaiming Co., Ltd. is prepared by heat treating butyl tubes under pressure. The rubber reclaim from bladders of Car Quest Co., Ltd. is prepared by grinding bladders in an extruder. Each of these reclaimed butyl rubbers may be used alone, or two or more of them may be used in combination.

The rubber composition of the present invention contains a halogenated butyl rubber (X-IIR) in addition to the reclaimed butyl rubber. Since the reclaimed butyl rubber typically contains a large amount of non-halogenated butyl rubber (regular butyl rubber), its combined use with a halogenated butyl rubber ensures good air barrier properties and a proper vulcanization rate.

Herein, when referred to simply as "halogenated butyl rubber", the term refers to a halogenated butyl rubber other than the reclaimed butyl rubber.

Examples of the halogenated butyl rubber include brominated butyl rubbers (Br-IIR) and chlorinated butyl rubbers (Cl-IIR). Preferred among these are chlorinated butyl rubbers, because they are excellent in vulcanization rate and scorch resistance when used in a system concomitantly containing natural rubber (NR).

The reclaimed butyl rubber content, based on 100 mass % of the rubber component, is 5 mass % or more, preferably 8 mass % or more. A reclaimed butyl rubber content of less than 5 mass % may not have a sufficient effect in reducing the compounding cost. The reclaimed butyl rubber content is 30 mass % or less, preferably 25 mass % or less. A reclaimed butyl rubber content of more than 30 mass % may make it impossible to ensure satisfactory air barrier properties and a sufficient vulcanization rate.

The halogenated butyl rubber content, based on 100 mass % of the rubber component, is preferably 40 mass % or more, more preferably 50 mass % or more, and still more preferably 60 mass % or more. A halogenated butyl rubber content of less than 40 mass % may not ensure satisfactory air barrier properties and a sufficient vulcanization rate. The halogenated butyl rubber content is preferably 80 mass % or less, and more preferably 75 mass % or less. If the halogenated butyl rubber content is more than 80 mass %, then the effect of improving performance is likely to reach a plateau and therefore tends not to match the increase in compounding cost.

The combined content of the reclaimed butyl rubber and the halogenated butyl rubber, based on 100 mass % of the rubber component, is 70 mass % or more, preferably 75 mass % or more, and more preferably 80 mass % or more. A combined content of less than 70 mass % may not achieve satisfactory air barrier properties. Although the combined content may be 100 mass %, it is preferably 95 mass % or less, and more preferably 90 mass % or less, in terms of sufficiently maintaining the finished quality of the joint of the inner liner, the adhesion to a neighboring component, and the peeling resistance after vulcanization.

Examples of other usable rubbers include, but not limited to, natural rubber (NR), isoprene rubber (IR), styrene-butadiene rubber (SBR), butadiene rubber (BR), epoxidized natural rubber (ENR), chloroprene rubber (CR), styrene-isoprene-butadiene copolymer rubber (SIBR), and styrene-isobutylene-styrene block copolymers (SIBS). Among these, NR and IR are preferred in terms of adhesion, and ENR and SIBS are preferred in terms of air barrier properties.

The NR is not particularly limited and may be one generally used in the tire industry, such as SIR20, RSS#3, and TSR20.

The NR content, based on 100 mass % of the rubber component, is preferably 5 mass % or more, and more preferably 10 mass % or more. A NR content of less than 5 mass % tends to lead to deterioration in adhesion and sheet processability. The NR content is preferably 40 mass % or less, and more preferably 35 mass % or less. A NR content of more than 40 mass % corresponds to reduction in the butyl rubber content, which may make it impossible to ensure satisfactory air barrier properties.

The rubber composition of the present invention contains as an extending filler at least one semi-reinforcing filler selected from the group consisting of finely ground bituminous coal, talc, mica, and hard clay. These semi-reinforcing fillers do not form polymer gels during kneading, which allows for good sheet processability. In terms of sheet processability and cost, the semi-reinforcing filler is preferably finely ground bituminous coal, common talc, or hard clay, and in terms of air barrier properties, it is preferably high aspect ratio mica or flat talc (e.g. HAR produced by Nihon Mistron Co., Ltd.).

Examples of the bituminous coal that may be contained in the rubber composition of the present invention include general coals. Such bituminous coal may be incorporated in the form of ground particles in the rubber composition.

The finely ground bituminous coal has an average particle size of 50 µm or less, preferably 30 µm or less. The average particle size of more than 50 µm may not lead to sufficiently improved fuel economy. The lower limit of the average particle size of finely ground bituminous coal is not particularly limited and is preferably 1 µm or more.

The talc preferably has an average particle size of 50 µm or less, and more preferably 30 µm or less. The average particle size of more than 50 µm may not lead to sufficiently improved fuel economy. The lower limit of the average particle size of talc is not particularly limited and is preferably 1 µm or more.

The mica preferably has an average particle size of 50 µm or less, and more preferably 30 µm or less. The average particle size of more than 50 µm may not lead to sufficiently improved fuel economy. The lower limit of the average particle size of mica is not particularly limited and is preferably 1 µm or more.

The hard clay preferably has an average particle size of 50 µm or less, and more preferably 30 µm or less. The average particle size of more than 50 µm may not lead to sufficiently improved fuel economy. The lower limit of the average particle size of hard clay is not particularly limited and is preferably 0.5 µm or more, and more preferably 1 µm or more.

The average particle sizes of these semi-reinforcing fillers each refer to an average particle size on a mass basis as determined from a particle size distribution measured in accordance with JIS Z 8815-1994.

The total semi-reinforcing filler content, per 100 parts by mass of the rubber component, is 3 parts by mass or more, preferably 8 parts by mass or more, and more preferably 10 parts by mass or more. A total semi-reinforcing filler content of less than 3 parts by mass may not ensure sufficient sheet processability. The total semi-reinforcing filler content is 45 parts by mass or less, preferably 40 parts by mass or less. A total semi-reinforcing filler content of more than 45 parts by mass may make it impossible to ensure sufficient elongation at break.

The rubber composition of the present invention contains carbon black and/or silica as a reinforcement. The reinforcement preferably includes at least carbon black, and may include a combination of carbon black and silica.

The carbon black has a nitrogen adsorption specific surface area ($N_2SA$) of 20 $m^2/g$ or more, preferably 25 $m^2/g$ or more. A carbon black having a $N_2SA$ of less than 20 $m^2/g$ may not achieve sufficient reinforcement. The carbon black has a $N_2SA$ of 35 $m^2/g$ or less. A carbon black having a $N_2SA$ of more than 35 $m^2/g$ may cause the rubber composition to be too hard, possibly leading to reduced elongation at break.

The nitrogen adsorption specific surface area of carbon black refers to a value measured in accordance with JIS K 6217-2:2001.

The silica has a nitrogen adsorption specific surface area ($N_2SA$) of 40 $m^2/g$ or more, preferably 70 $m^2/g$ or more. A silica having a $N_2SA$ of less than 40 $m^2/g$ may not achieve sufficient reinforcement. The silica has a $N_2SA$ of 120 $m^2/g$ or less. A silica having a $N_2SA$ of more than 120 $m^2/g$ may cause deterioration in air barrier properties and tan δ.

The $N_2SA$ of silica refers to a value measured by the BET method in accordance with ASTM D3037-81.

The combined content of the carbon black and the silica is 20 to 60 parts by mass per 100 parts by mass of the rubber component, in terms of achieving favorable reinforcement. The lower limit of the combined content of the carbon black and the silica is preferably 30 parts by mass or more, and more preferably 35 parts by mass or more. The upper limit is preferably 50 parts by mass or less, and more preferably 45 parts by mass or less.

In terms of achieving favorable reinforcement, the carbon black content, per 100 parts by mass of the rubber component, is preferably 20 parts by mass or more, more preferably 30 parts by mass or more, and still more preferably 35 parts by mass or more, and is preferably 60 parts by mass or less, more preferably 50 parts by mass or less, and still more preferably 45 parts by mass or less.

The silica content is preferably 0 to 30 parts by mass per 100 parts by mass of the rubber component. The use of the silica improves elongation at break; however, it may cause shrinkage of the rubber composition.

The rubber composition of the present invention preferably contains a mixed resin. The mixed resin serves to fill the gap between a reinforcement (e.g. carbon black) and a polymer, thereby further improving air barrier properties. The mixed resin refers to a mixture of two or more resins. Examples of the resins used for the mixed resin include aromatic hydrocarbon resins such as phenolic tackifying resins, chroman resins, indene resins, and chroman-indene resins; and aliphatic hydrocarbon resins (e.g. $C_5$, $C_8$, and $C_9$ resins). Two or more of these can be mixed and used as the mixed resin. Preferred among these are combinations of an aromatic hydrocarbon resin and an aliphatic hydrocarbon resin.

Specific examples of the mixed resin include Struktol 40MS produced by Struktol Company, Rhenosin 145A produced by Rhein Chemie Corp., and Promix 400 produced by Flow Polymers Inc.

The mixed resin content, per 100 parts by mass of the rubber component, is preferably 1 part by mass or more, and more preferably 2 parts by mass or more. A mixed resin content of less than 1 part by mass may not sufficiently improve air barrier properties. The mixed resin content is preferably 20 parts by mass or less, more preferably 12 parts by mass or less, and still more preferably 8 parts by mass or less. A mixed resin content of more than 20 parts by mass may remarkably reduce the viscosity of the kneaded rubber mixture, possibly causing deterioration in sheet processability and tan δ.

The rubber composition of the present invention preferably contains stearic acid. The stearic acid content, per 100 parts by mass of the rubber component, is preferably 0.5 parts by mass or more, and more preferably 0.8 parts by mass or more. A stearic acid content of less than 0.5 parts by mass is likely to lead to difficulty in dispersing zinc oxide, which tends to deteriorate sheet processability and elongation at break. The stearic acid content is preferably 2.7 parts by mass or less, more preferably 2.0 parts by mass or less, and still more preferably 1.8 parts by mass or less. A stearic acid content of more than 2.7 parts by mass is likely to excessively increase the lubricity during kneading, which tends to deteriorate filler dispersibility and elongation at break.

The rubber composition of the present invention preferably contains zinc oxide. Zinc oxide serves to promote crosslinking in the isoprene units of a butyl rubber, and thereby enhances E* and reduces tan δ. The zinc oxide content, per 100 parts by mass of the rubber component, is preferably 0.8 parts by mass or more, and more preferably 1.0 part by mass or more. A zinc oxide content of less than 0.8 parts by mass may fail to sufficiently enhance E* and sufficiently reduce tan δ. The zinc oxide content is preferably 2.9 parts by mass or less, more preferably 2.0 parts by mass or less, and still more preferably 1.8 parts by mass or less. If the zinc oxide content exceeds 2.9 parts by mass, undispersed agglomerates of zinc oxide may cause rubber scorch, possibly causing deterioration in sheet processability. Moreover, some voids are formed around the undispersed agglomerates of zinc oxide, and therefore air may flow through the voids, possibly resulting in poor air barrier properties. In addition, the compounding cost increases.

The rubber composition of the present invention preferably contains an antioxidant. The antioxidant is not particularly limited, and those used in the rubber field may be used. Examples thereof include quinoline, quinone, phenol, and phenylenediamine antioxidants. Preferred among these are quinoline antioxidants, because they effectively suppress oxidation degradation and are less likely to cause rubber scorch. Examples of the quinoline antioxidants include 2,2,4-trimethyl-1,2-dihydroquinoline polymers and 6-ethoxy-2,2,4-trimethyl-1,2-dihydroquinoline, and preferred are 2,2,4-trimethyl-1,2-dihydroquinoline polymers.

The quinoline antioxidant content, per 100 parts by mass of the rubber component, is preferably 0.5 parts by mass or more, and more preferably 0.8 parts by mass or more. If the quinoline antioxidant content is less than 0.5 parts by mass, the quinoline antioxidant may not sufficiently suppress oxidation degradation of the inner liner and neighboring components. The quinoline antioxidant content is preferably 2.0 parts by mass or less, more preferably 1.5 parts by mass or less, and still more preferably 1.2 parts by mass or less. If the quinoline antioxidant content is more than 2.0 parts by mass, slip of the rotor tends to easily occur, which may cause deterioration in filler dispersibility, elongation at break, and kneading efficiency.

The use of a phenylenediamine antioxidant such as N-(1,3-dimethylbutyl)-N'-phenyl-p-phenylenediamine or N-isopropyl-N'-phenyl-p-phenylenediamine may cause a butyl rubber to scorch easily during kneading. Hence, the phenylenediamine antioxidant content in the rubber composition of the present invention is preferably as low as possible. From such a point of view, the phenylenediamine antioxidant content is preferably 0.5 parts by mass or less, more preferably 0.3 parts by mass or less, and still more preferably 0 parts by mass (substantially not contained), per 100 parts by mass of the rubber component.

The rubber composition of the present invention preferably contains an alkylphenol-sulfur chloride condensate represented by the following formula (1). This further improves fuel economy. Additionally, the co-crosslinking with a neighboring component is improved and therefore good peeling resistance (adhesion) is achieved.

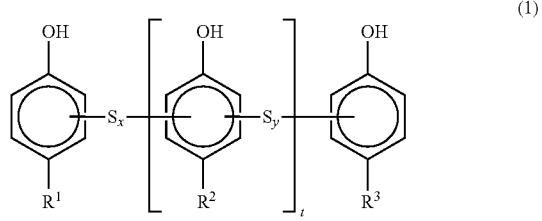

(1)

In the formula, $R^1$, $R^2$ and $R^3$ are the same as or different from one another and each represent a C5 to C12 alkyl group; x and y are the same as or different from each other and each represent an integer of 1 to 3; and t represents an integer of 0 to 250.

The symbol t is an integer of 0 to 250, preferably an integer of 0 to 100, still more preferably an integer of 10 to 100, and particularly preferably an integer of 20 to 50, because the alkylphenol-sulfur chloride condensate disperses well into the rubber component. The symbols x and y are preferably both 2 so that high hardness can be efficiently achieved. The symbols $R^1$ to $R^3$ are each preferably a C6 to C9 alkyl group because the alkylphenol-sulfur chloride condensate disperses well into the rubber component.

The alkylphenol-sulfur chloride condensate may be prepared by a known method. For example, a method in which an alkylphenol is reacted with sulfur chloride at a molar ratio of, for example, 1:0.9-1.25 may be applied. Specific examples of the alkylphenol-sulfur chloride condensate include Tackirol V200 (in the formula (1), $R^1$, $R^2$ and $R^3$ are each an octyl group ($-C_8H_{17}$); x and y are each 2; and t is 0 to 100) and TS3101 (in the formula (1), $R^1$, $R^2$ and $R^3$ are each a dodecyl group ($-C_{12}H_{25}$); x and y are each 2; and t is 150 to 200), both produced by Taoka Chemical Co., Ltd.

In the rubber composition of the present invention which contains the alkylphenol-sulfur chloride condensate, the alkylphenol-sulfur chloride condensate content, per 100 parts by mass of the rubber component, is preferably 0.1 parts by mass or more, and more preferably 0.3 parts by mass or more. An alkylphenol-sulfur chloride condensate content of less than 0.1 parts by mass may not sufficiently improve fuel economy. The alkylphenol-sulfur chloride condensate content is preferably 3 parts by mass or less, and more preferably 1.5 parts by mass or less. An alkylphenol-sulfur chloride condensate content of more than 3 parts by mass may lead to too fast a vulcanization rate, possibly causing rubber scorch more frequently.

The rubber composition of the present invention may optionally contain additives (e.g. oil, vulcanization accelerators and sulfur) generally used for the preparation of rubber compositions, in addition to the above components.

Examples of the oil include aromatic oils, process oils, and paraffin oils. Preferred among these are paraffin oils, because they have good bleed resistance with respect to butyl rubbers, and are less likely to cause problems such as sulfur bloom and adhesion failure.

The oil content, per 100 parts by mass of the rubber component, is preferably 1 part by mass or more, more preferably 3 parts by mass or more, and still more preferably 5 parts by mass or more, for good sheet processability. The oil content is preferably 15 parts by mass or less, more preferably 10 parts by mass or less, and still more preferably 8 parts by mass or less, in terms of ensuring satisfactory air barrier properties and filler dispersibility.

Examples of the vulcanization accelerators include sulfenamide, thiazole, thiuram, thiourea, guanidine, dithiocarbamate, aldehyde-amine, aldehyde-ammonia, imidazoline, and xanthate vulcanization accelerators. Preferred among these are thiazole vulcanization accelerators, and more preferred is di-2-benzothiazolyl disulfide, because they have a high melting point and are less likely to cause rubber scorch.

The vulcanization accelerator content, per 100 parts by mass of the rubber component, is preferably 0.2 parts by mass or more, more preferably 0.5 parts by mass or more, and still more preferably 0.8 parts by mass or more. A vulcanization accelerator content of less than 0.2 parts by mass may not ensure a sufficient vulcanization rate. The vulcanization accelerator content is preferably 5 parts by mass or less, more preferably 3 parts by mass or less, and still more preferably 2 parts by mass or less. A vulcanization accelerator content of more than 5 parts by mass may cause too fast a vulcanization rate.

The sulfur is not particularly limited, and those generally used in the tire industry may be used.

For favorably forming a crosslinked structure, the sulfur content, per 100 parts by mass of the rubber component, is preferably 0.3 parts by mass or more, and more preferably 0.4 parts by mass or more, and is preferably 1.0 parts by mass or less, and more preferably 0.8 parts by mass or less.

The sulfur content herein includes the amount of sulfur derived from the alkylphenol-sulfur chloride condensate represented by the formula (1).

The rubber composition of the present invention can be prepared by a commonly used method. Specifically, for example, the above components are kneaded with a known kneading machine generally used in the rubber industry, such as a Banbury mixer, a kneader, or an open roll mill, and then the resulting mixture is vulcanized, whereby the rubber composition can be prepared.

The rubber composition (vulcanized rubber composition) of the present invention preferably has a tan δ at 70° C. of 0.20 or lower. A rubber composition with a tan δ of higher than 0.20 may not ensure sufficient fuel economy. The lower limit of the tan δ at 70° C. is not particularly limited, and is typically 0.10 or higher when the combined content of the reclaimed butyl rubber and the halogenated butyl rubber is 70 mass % or more.

The tan δ at 70° C. is measured according to the method described in the EXAMPLES below.

The pneumatic tire of the present invention can be used for passenger vehicles, heavy load vehicles, industrial vehicles and the like, and is particularly suitable for passenger vehicles.

The pneumatic tire of the present invention can be produced by a commonly used method using the above rubber composition. Specifically, the rubber composition is extruded and processed into the shape of an inner liner, arranged in a usual manner in a tire building machine, and assembled with other tire components to form an unvulcanized tire. The resultant unvulcanized tire is then heat-pressurized in a vulcanizer to produce a tire.

Examples

Hereinafter, the present invention will be described in more detail based on examples. The examples are not intended to limit the scope of the present invention.
NR: TSR20
Chlorinated butyl rubber: chlorobutyl HT1066 produced by Exxon Mobil Corporation
Rubber reclaim: rubber reclaim (butyl rubber: 50 mass %, carbon black N660: 33 mass %, other components: 17 mass %) produced by Car Quest Co., Ltd.
Carbon black N762: Statex N762 ($N_2SA$: 29 $m^2/g$) produced by Columbian Chemicals Company
Carbon black N660: N660 ($N_2SA$: 35 $m^2/g$) produced by Jiangxi Black Cat Carbon Black Co., Ltd.
Carbon black N550: ShoBlack N550 ($N_2SA$: 40 $m^2/g$) produced by Cabot Japan K. K.
Silica Z1085: Z1085Gr ($N_2SA$: 85 $m^2/g$) produced by Rhodia
Silica Z115GR: Z115Gr ($N_2SA$: 115 $m^2/g$) produced by Rhodia
Silica VN3: ULTRASIL VN3 ($N_2SA$: 175 $m^2/g$) produced by Degussa
Silane coupling agent: Si75 produced by Degussa
Mixed resin: 40MS (a mixture of an aromatic hydrocarbon resin and an aliphatic hydrocarbon resin) produced by Struktol Company
Mineral oil: Diana Process Oil PA32 (paraffin oil) produced by Idemitsu Kosan Co., Ltd.
Zinc oxide: zinc oxide #2 produced by Mitsui Mining & Smelting Co., Ltd.
Stearic acid: stearic acid "Tsubaki" produced by NOF Corporation
Antioxidant 6PPD: Antigene 6C produced by Sumitomo Chemical Co., Ltd.
Antioxidant RD: Nocrack 224 produced by Ouchi Shinko Chemical Industrial Co., Ltd.
Finely ground bituminous coal 1: Austin Black 325 (average particle size: 5 μm, specific gravity: 1.3, BET specific surface area: 9.0 $m^2/g$, oil content: 17 mass %) produced by Coal Fillers Inc.
Finely ground bituminous coal 2: Austin Black 325 (average particle size: 20 μm, oil content: 17 mass %) produced by Coal Fillers Inc.
Finely ground bituminous coal 3: Austin Black 325 (average particle size: 80 μm, oil content: 17 mass %) produced by Coal Fillers Inc.
Finely ground bituminous coal 4: Austin Black 325 (average particle size: 200 μm, oil content: 17 mass %) produced by Coal Fillers Inc.
Talc (flat talc): HAR (average particle size: 5.7 μm, specific gravity: 2.7, BET specific surface area: 22 $m^2/g$) produced by Nihon Mistron Co., Ltd.
Mica: mica S-200HG (phlogopite, average particle size: 50 μm, aspect ratio: 55) produced by Repco Inc.
Hard clay: Crown Clay (average particle size: 0.6 μm) produced by Southeastern Clay Company
Calcium carbonate: Tancaru 200 (average particle size: 2.7 μm, specific gravity: 2.68, BET specific surface area: 1.5 $m^2/g$) produced by Takehara Kagaku Kogyo Co., Ltd.
5% Oil-containing sulfur powder: HK-200-5 (oil content: 5 mass %) produced by Hosoi Chemical Industry Co., Ltd.

V200: Tackirol V200 (an alkylphenol-sulfur chloride condensate represented by the formula (1) in which $R^1$, $R^2$ and $R^3$ are each an octyl group (—$C_8H_{17}$); x and y are each 2; and t is 0 to 100; sulfur content: 24 mass %; weight-average molecular weight: 9000) produced by Taoka Chemical Co., Ltd.
Vulcanization accelerator DM: Nocceler DM (di-2-benzothiazolyl disulfide) produced by Ouchi Shinko Chemical Industrial Co., Ltd.

Examples and Comparative Examples

According to each composition shown in Table 1 or 2, all of the chemicals except the zinc oxide, crosslinking agent(s) (sulfur, alkylphenol-sulfur chloride condensate), and vulcanization accelerator, were kneaded using a 1.7 L-Banbury mixer. Subsequently, to the kneaded mixture were added the zinc oxide, crosslinking agent(s), and vulcanization accelerator, and the resulting mixture was kneaded with a roll to prepare an unvulcanized rubber composition. The unvulcanized rubber composition was press vulcanized at 150° C. for 30 minutes to obtain a vulcanized rubber composition.
(Viscoelasticity Test)
The complex modulus (E*) and the loss tangent (tan δ) of the obtained vulcanized rubber compositions were measured at a temperature of 70° C., a frequency of 10 Hz, an initial strain of 10%, and a dynamic strain of 2%, using a viscoelasticity spectrometer VES (Iwamoto Seisakusho Co., Ltd.). An E* in the target range indicates good handling stability. The lower the tan δ is, the better the fuel economy is. The results of tan δ are also expressed in indices where the tan δ of Comparative Example 1 is 100. The higher the index is, the better the fuel economy is.
(Tensile Test)
A tensile test in accordance with JIS K 6251 "Rubber, vulcanized or thermoplastic—Determination of tensile stress-strain properties" was performed at room temperature on No. 3 dumbbell specimens formed of each vulcanized rubber composition to measure the elongation at break EB (%). The higher the EB is, the better the elongation at break (durability) is. The results of EB are also expressed in indices where the EB of Comparative Example 1 is 100. The higher the index is, the better the elongation at break is.
(Sheet Processability Test)
When extruded and processed, the unvulcanized rubber compositions were evaluated in terms of the following four properties: the scorch resistance of the extrudate, the flatness of the sheet, the shrinkage of the sheet, and the edge irregularities. The results of sheet processability of the unvulcanized rubber compositions are expressed in indices where the sheet processability index of Comparative Example 1 is 100. The higher the index, the better the sheet processability.
(Air Permeability Test)
The air permeabilities of the vulcanized rubber compositions were measured in accordance with ASTM D-1434-75M, and expressed in indices using the following equation. The higher the index of air barrier properties, the lower the air permeability of the vulcanized rubber composition, and, in turn, the better the air barrier properties.

(Index of air barrier properties)=(air permeability of Comparative Example 1)/(air permeability of each rubber composition)×100

(Compounding Cost)
The compounding costs of the rubber compositions are expressed in indices where the compounding cost of Comparative Example 1 is 100. The higher the index, the lower the compounding cost, and, in turn, the better the performance.

The compounding costs of the compounding ingredients are shown below. Organic substances requiring complicated production processes and heavy metals such as zinc oxide are expensive. Moreover, the order from more to less expensive polymers is: halogenated butyl rubber, NR, and reclaimed butyl rubber. The order from more to less expensive fillers is: mica/flat talc, silicas, carbon blacks, and semi-reinforcing fillers other than the mica and flat talc. On the other hand, the mineral oil and stearic acid, which can be easily produced, are less expensive. The key point in cost reduction is to reduce the amount of expensive compounding ingredients.

A: mineral oil, stearic acid, and sulfur
A: tackifying resins (mixed resin) and bituminous coals
B: hard clay, common talc, and calcium carbonate
B: carbon blacks and antioxidant RD
B: reclaimed butyl rubber
C: NR and silicas
D: halogenated butyl rubber, antioxidant 6PPD, silane coupling agent, flat talc, vulcanization accelerator, and mica
E: zinc oxide and V200

⟨Definition of Symbols⟩
A: 100 yen/L or less
B: 250 yen/L or less
C: 400 yen/L or less
D: 550 yen/L or less
E: 551 yen/L or more

TABLE 1

| Composition (part(s) by mass) | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | NR | 20 | 20 | 20 | 20 | 20 | 20 | 20 | 20 | 20 | 30 | 5 | 20 | 15 | 20 | 20 |
| | Chlorinated butyl rubber | 70 | 70 | 70 | 70 | 75 | 50 | 50 | 70 | 70 | 60 | 85 | 70 | 75 | 70 | 70 |
| | Rubber reclaim (butyl rubber content) | 20 (10) | 20 (10) | 20 (10) | 20 (10) | 10 (5) | 40 (20) | 60 (30) | 20 (10) | 20 (10) | 20 (10) | 20 (10) | 20 (10) | 20 (10) | 20 (10) | 20 (10) |
| | Carbon black N762 | 40 | 40 | 40 | 40 | 43 | 33.5 | 40 | 40 | 40 | 40 | 40 | 43 | 40 | — | — |
| | Carbon black N660 | — | — | — | — | — | — | — | — | — | — | — | — | — | 50 | 25 |
| | Carbon black N550 | — | — | — | — | — | — | — | — | — | — | — | — | — | — | — |
| | Silica Z1085 | — | — | — | — | — | — | — | — | — | — | — | — | — | — | 20 |
| | Silica Z115GR | — | — | — | — | — | — | — | — | — | — | — | — | — | — | — |
| | Silica VN3 | — | — | — | — | — | — | — | — | — | — | — | — | — | — | — |
| | Silane coupling agent | — | — | — | — | — | — | — | — | — | — | — | — | — | — | 1.2 |
| | Mixed resin | 5 | 5 | 5 | 5 | 5 | 5 | 5 | 5 | 5 | 5 | 5 | 15 | 1 | 5 | 5 |
| | Mineral oil | — | — | — | — | 7 | 4 | 6 | 6 | 6 | 6 | 12 | 6 | 10 | 6 | 6 |
| | Zinc oxide | 6 | 6 | 6 | 6 | — | — | — | — | — | — | — | — | — | — | — |
| | Stearic acid | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Antioxidant 6PPD | 1.5 | 1.5 | 1.5 | 1.5 | 1.5 | 1.5 | 1.5 | 1.5 | 1.5 | 1.5 | 1.0 | 1.5 | 1.5 | 1.5 | 1.5 |
| | Antioxidant RD | 1 | 1 | 1 | 1 | 1 | 1 | 1 | 1 | 1 | 1 | 1 | 1 | 1 | 1 | 1 |
| | Finely ground bituminous coal 1 | 20 | — | 5 | 35 | 20 | 20 | 20 | 20 | — | — | 20 | 20 | 20 | 20 | 20 |
| | Finely ground bituminous coal 2 | — | 20 | — | — | — | — | — | — | — | — | — | — | — | — | — |
| | Finely ground bituminous coal 3 | — | — | — | — | — | — | — | — | 20 | — | — | — | — | — | — |
| | Finely ground bituminous coal 4 | — | — | — | — | — | — | — | — | — | 20 | — | — | — | — | — |
| | Talc | — | — | — | — | — | — | — | — | — | — | — | — | — | — | — |
| | Mica | — | — | — | — | — | — | — | — | — | — | — | — | — | — | — |
| | Hard clay | — | — | — | — | — | — | — | — | — | — | — | — | — | — | — |
| | Calcium carbonate | — | — | — | — | — | — | — | — | — | — | — | — | — | — | — |
| | 5% Oil-containing sulfur powder (a) | 0.45 | 0.45 | 0.45 | 0.45 | 0.45 | 0.3 | 0.3 | 0.3 | 0.45 | 0.45 | 0.2 | 0.45 | 0.45 | 0.45 | 0.45 |
| | V200 (b) | — | — | — | — | — | 0.5 | 0.5 | 0.5 | — | — | 1.0 | — | — | — | — |
| | Total sulfur content of (a) and (b) | 0.428 | 0.428 | 0.428 | 0.428 | 0.428 | 0.405 | 0.405 | 0.405 | 0.428 | 0.428 | 0.430 | 0.428 | 0.428 | 0.428 | 0.428 |
| | Vulcanization accelerator DM | 1.25 | 1.25 | 1.25 | 1.25 | 1.25 | 1.25 | 1.25 | 1.25 | 1.25 | 1.25 | 1.25 | 1.25 | 1.25 | 1.25 | 1.25 |
| Evaluation | E* (Target: 3.0 to 4.0) | 3.55 | 3.51 | 3.51 | 3.72 | 3.61 | 3.40 | 3.59 | 3.59 | 3.89 | 3.77 | 3.38 | 3.12 | 3.42 | 3.89 | 3.22 |
| | tan δ (Target: <0.20) | 0.191 | 0.187 | 0.187 | 0.198 | 0.182 | 0.177 | 0.165 | 0.165 | 0.191 | 0.174 | 0.190 | 0.189 | 0.191 | 0.184 | 0.172 |
| | EB (%) (Target: >550) | 595 | 585 | 605 | 555 | 615 | 565 | 600 | 600 | 595 | 605 | 660 | 560 | 635 | 570 | 655 |
| | tan δ index (Target: ≥102) | 105 | 107 | 107 | 102 | 110 | 114 | 122 | 122 | 105 | 116 | 106 | 106 | 105 | 109 | 117 |
| | EB index (Target: ≥105) | 117 | 115 | 119 | 109 | 121 | 111 | 118 | 118 | 117 | 119 | 129 | 110 | 125 | 112 | 128 |
| | Sheet processability index (Target: ≥90) | 100 | 100 | 95 | 110 | 100 | 90 | 90 | 90 | 105 | 100 | 100 | 103 | 100 | 100 | 95 |
| | Index of air barrier properties (Target: ≥100) | 101 | 101 | 101 | 101 | 103 | 102 | 101 | 101 | 111 | 102 | 129 | 100 | 102 | 104 | 105 |

TABLE 1-continued

| | | Example | | | | | | | | | | | | | | |
|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 | 30 |
| Compounding cost index (Target: ≥102) | | 110 | 110 | 105 | 113 | 107 | 120 | 105 | 105 | 102 | 114 | 102 | 116 | 107 | 115 | 103 |
| Composition (part(s) by mass) | NR | 20 | 20 | 20 | 20 | 20 | 20 | 20 | 20 | 20 | 20 | 20 | 20 | — | 20 | 20 |
| | Chlorinated butyl rubber | 70 | 70 | 70 | 70 | 70 | 70 | 70 | 70 | 70 | 70 | 70 | 70 | 85 | 65 | 70 |
| | Rubber reclaim (butyl rubber reclaim content) | 20 (10) | 20 (10) | 20 (10) | 20 (10) | 20 (10) | 20 (10) | 20 (10) | 20 (10) | 20 (10) | 20 (10) | 20 (10) | 20 (10) | 30 (15) | 30 (15) | 20 (10) |
| | Carbon black N762 | 25 | — | — | — | — | — | — | — | — | — | — | — | — | — | — |
| | Carbon black N660 | — | 40 | 40 | 40 | 40 | 40 | 40 | 40 | 40 | 45 | 40 | 40 | 40 | 40 | 40 |
| | Carbon black N550 | 20 | — | — | — | — | — | — | — | — | — | — | — | — | — | — |
| | Silica Z1085 | — | — | — | — | — | — | — | — | — | — | — | — | — | — | — |
| | Silica Z115GR | — | — | — | — | — | — | — | — | — | — | — | — | — | — | — |
| | Silica VN3 | — | — | — | — | — | — | — | — | — | — | — | — | — | — | — |
| | Silane coupling agent | 1.2 | — | — | — | — | — | — | — | — | — | — | — | — | — | — |
| | Mixed resin | 5 | 5 | 5 | 5 | 5 | 5 | 5 | 5 | 11 | 22 | 5 | 5 | 5 | 5 | 5 |
| | Mineral oil | 6 | 6 | 6 | 6 | 6 | 6 | 6 | 6 | — | — | 6 | 6 | 12 | 6 | 6 |
| | Zinc oxide | 1.5 | 1.5 | 1.5 | 0.6 | 5 | 1.5 | 1.5 | 1.5 | 1.5 | 1.5 | 0.8 | 2.9 | 1.5 | 1.5 | 1.5 |
| | Stearic acid | 1.5 | 0.5 | 2.7 | 1.5 | 1.5 | 1.5 | 1.5 | 1.5 | 1.5 | 1.5 | 1.5 | 1.5 | 1.0 | 1.5 | 1.5 |
| | Antioxidant 6PPD | — | — | — | — | — | — | 1 | — | — | — | — | — | — | — | — |
| | Antioxidant RD | 1 | 1 | 1 | 1 | 1 | 1 | — | 1 | 1 | 1 | 1 | 1 | 1 | 1 | 1 |
| | Finely ground bituminous coal 1 | — | — | — | — | — | 3 | — | — | — | — | — | — | 20 | — | — |
| | Finely ground bituminous coal 2 | 20 | — | — | — | — | 20 | — | — | 20 | 20 | — | — | — | — | — |
| | Finely ground bituminous coal 3 | — | — | — | — | — | — | — | — | — | — | — | — | — | — | — |
| | Finely ground bituminous coal 4 | — | — | — | — | — | — | — | — | — | — | — | — | — | — | — |
| | Talc | — | 20 | 20 | 20 | 20 | — | 20 | — | — | — | — | 20 | — | — | — |
| | Mica | — | — | — | — | — | — | — | — | — | — | — | — | — | 40 | 25 |
| | Hard clay | — | — | — | — | — | — | — | 15 | — | — | — | — | — | — | — |
| | Calcium carbonate | — | — | — | — | — | — | — | — | — | — | 20 | — | 1 | — | 20 |
| | 5% Oil-containing sulfur powder V200 (a) | 0.45 | 0.45 | 0.45 | 0.45 | 0.45 | 0.45 | 0.45 | 0.45 | 0.45 | 0.45 | 0.45 | 0.45 | 0.20 | 0.45 | 0.45 |
| | Total sulfur content of (a) and (b) | 0.428 | 0.428 | 0.428 | 0.428 | 0.428 | 0.428 | 0.428 | 0.428 | 0.428 | 0.428 | 0.428 | 0.428 | 0.430 | 0.428 | 0.428 |
| | Vulcanization accelerator DM | 1.25 | 1.25 | 1.25 | 1.25 | 1.25 | 1.25 | 1.25 | 1.25 | 1.25 | 1.25 | 1.25 | 1.25 | 1.25 | 1.25 | 1.25 |
| Evaluation | E* (Target: 3.0 to 4.0) | 3.55 | 3.57 | 3.95 | 3.65 | 3.87 | 3.42 | 3.59 | 3.97 | 3.41 | 3.08 | 3.67 | 3.81 | 3.30 | 3.58 | 3.51 |
| | tan δ (Target: <0.20) | 0.188 | 0.191 | 0.198 | 0.186 | 0.171 | 0.191 | 0.191 | 0.191 | 0.190 | 0.195 | 0.182 | 0.173 | 0.199 | 0.192 | 0.198 |
| | EB (%) (Target: >550) | 670 | 555 | 580 | 615 | 625 | 555 | 575 | 555 | 640 | 540 | 615 | 620 | 665 | 605 | 605 |
| | tan δ index (Target: ≥102) | 107 | 105 | 102 | 108 | 118 | 105 | 105 | 105 | 106 | 103 | 110 | 116 | 101 | 105 | 102 |
| | EB index (Target: ≥105) | 131 | 109 | 114 | 121 | 123 | 109 | 113 | 109 | 125 | 106 | 121 | 122 | 130 | 119 | 119 |

TABLE 1-continued

| Sheet processability index (Target: ≥90) | 90 | 90 | 105 | 90 | 105 | 95 | 90 | 110 | 100 | 90 | 92 | 103 | 100 | 105 |
|---|---|---|---|---|---|---|---|---|---|---|---|---|---|---|
| Index of air barrier properties (Target: ≥100) | 101 | 100 | 100 | 101 | 100 | 100 | 100 | 100 | 100 | 100 | 101 | 100 | 100 | 105 |
| Compounding cost index (Target: ≥102) | 104 | 111 | 116 | 115 | 105 | 113 | 108 | 106 | 107 | 120 | 114 | 103 | 134 | 120 |
| | | | | | | | | | | | | 103 | 102 | 102 |
| | | | | | | | | | | | | | | 113 |
| | | | | | | | | | | | | | | 110 |

TABLE 2

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
| Composition (part(s) by mass) | NR | 20 | 20 | 20 | 35 | 20 | 20 | 20 | 20 | 20 | 20 |
|  | Chlorinated butyl rubber | 80 | 80 | 40 | 65 | 80 | 70 | 70 | 70 | 70 | 70 |
|  | Rubber reclaim (butyl rubber content) | — | — | 80 (40) | — | — | 20 (10) | 20 (10) | 20 (10) | 20 (10) | 20 (10) |
|  | Carbon black N762 | — | — | — | — | — | — | 65 | — | — | — |
|  | Carbon black N660 | 46.5 | 46.5 | 20.3 | 40 | 46.5 | — | — | 15 | 40 | 40 |
|  | Carbon black N550 | — | — | — | — | — | 30 | — | — | — | — |
|  | Silica Z1085 | — | — | — | — | — | — | — | — | — | — |
|  | Silica Z115GR | — | — | — | — | — | — | — | — | — | — |
|  | Silica VN3 | — | — | — | — | — | — | — | 30 | — | — |
|  | Silane coupling agent | — | — | — | — | — | — | — | 2.4 | — | — |
|  | Mixed resin | 0 | 5 | 5 | 5 | 5 | 5 | 5 | 5 | 5 | 5 |
|  | Mineral oil | 9 | 6 | 0 | 6 | 6 | 6 | 6 | 6 | 6 | 6 |
|  | Zinc oxide | 1.5 | 1.5 | 1.5 | 1.5 | 1.5 | 1.5 | 1.5 | 1.5 | 1.5 | 1.5 |
|  | Stearic acid | 1.5 | 1.5 | 1.5 | 1.5 | 1.5 | 1.5 | 1.5 | 1.5 | 1.5 | 1.5 |
|  | Antioxidant 6PPD | — | — | — | — | — | — | — | — | — | — |
|  | Antioxidant RD | 1 | 1 | 1 | 1 | 1 | 1 | 1 | 1 | 1 | 1 |
|  | Finely ground bituminous coal 1 | — | 20 | 20 | 20 | 20 | 20 | 20 | 20 | — | — |
|  | Finely ground bituminous coal 2 | — | — | — | — | — | — | — | — | — | — |
|  | Finely ground bituminous coal 3 | — | — | — | — | — | — | — | — | 20 | — |
|  | Finely ground bituminous coal 4 | — | — | — | — | — | — | — | — | — | 20 |
|  | Talc | — | — | — | — | — | — | — | — | — | — |
|  | Mica | — | — | — | — | — | — | — | — | — | — |
|  | Hard clay | — | — | — | — | — | — | — | — | — | — |
|  | Calcium carbonate | 30 | — | — | — | — | — | — | — | — | — |
|  | 5% Oil-containing sulfur powder (a) | 0.45 | 0.45 | 0.45 | 0.45 | 0.45 | 0.45 | 0.4 | 0.45 | 0.45 | 0.45 |
|  | V200 (b) | — | — | — | — | — | — | — | — | — | — |
|  | Total sulfur content of (a) and (b) | 0.428 | 0.428 | 0.428 | 0.428 | 0.428 | 0.428 | 0.380 | 0.428 | 0.428 | 0.428 |
|  | Vulcanization accelerator DM | 1.25 | 1.25 | 1.25 | 1.25 | 1.25 | 1.25 | 1.25 | 1.25 | 1.25 | 1.25 |
| Evaluation | E* (Target: 3.0 to 4.0) | 3.99 | 3.67 | 3.52 | 3.67 | 3.67 | 3.59 | 3.92 | 3.37 | 3.52 | 3.49 |
|  | tan δ (Target: <0.20) | 0.201 | 0.185 | 0.255 | 0.184 | 0.185 | 0.218 | 0.227 | 0.204 | 0.189 | 0.187 |
|  | EB (%) (Target: >550) | 510 | 585 | 505 | 580 | 610 | 600 | 505 | 635 | 545 | 525 |
|  | tan δ index (Target: ≥102) | 100 | 109 | 79 | 109 | 109 | 92 | 89 | 99 | 106 | 107 |
|  | EB index (Target: ≥105) | 100 | 115 | 99 | 114 | 120 | 118 | 99 | 125 | 107 | 103 |
|  | Sheet processability index (Target: ≥90) | 100 | 95 | 100 | 103 | 95 | 100 | 85 | 80 | 100 | 105 |
|  | Index of air barrier properties (Target: ≥100) | 100 | 101 | 89 | 85 | 101 | 92 | 100 | 91 | 98 | 96 |
|  | Compounding cost index (Target: ≥102) | 100 | 90 | 135 | 112 | 90 | 101 | 110 | 93 | 110 | 110 |

The rubber compositions of the examples, each of which contained predetermined amounts of a reclaimed butyl rubber, a halogenated butyl rubber, a specific semi-reinforcing filler, and a specific carbon black and/or a specific silica, were more improved in handling stability, fuel economy, elongation at break, sheet processability, air barrier properties, and compounding cost in a balanced manner, compared with the rubber composition of Comparative Example 1.

The air barrier properties of the rubber compositions of the following examples were better by 10% or more than those of the rubber composition of Comparative Example 1: Examples 11 and 28, in which the reclaimed butyl rubber and the halogenated butyl rubber were contained in large amounts; Example 9, in which the combined content of the reclaimed butyl rubber and the halogenated butyl rubber was 80 parts by mass and talc was also used; and Examples 29 and 30, in which the combined content of the reclaimed butyl rubber and the halogenated butyl rubber was 80 parts by mass and mica was also used.

In the rubber composition of Example 21 containing 3 parts by mass of antioxidant RD, the elongation at break and the sheet processability were in acceptable levels, but were inferior to those in Example 1 since the filler dispersibility was reduced.

In the rubber composition of Example 22 containing the antioxidant 6PPD, the extrudate partially scorched; therefore, the sheet processability was inferior to that of Example 1 although it was in acceptable levels.

In the rubber composition of Example 17 containing a small amount of stearic acid, the zinc oxide dispersibility was reduced; therefore, the elongation at break and the sheet processability were inferior to those of Example 1 although they were in acceptable levels.

In the rubber composition of Example 18 containing a large amount of stearic acid, the lubricity during kneading was too high, which caused reduced filler dispersibility. Therefore, the fuel economy was inferior to that of Example 1 although it was in acceptable levels.

The invention claimed is:

1. An inner liner rubber composition, comprising:
    a rubber component containing a reclaimed butyl rubber and a halogenated butyl rubber other than the reclaimed butyl rubber;
    at least one semi-reinforcing filler selected from the group consisting of finely ground bituminous coal having an average particle size of 50 μm or less, talc, mica, and hard clay;
    at least one of a carbon black having a nitrogen adsorption specific surface area of 20 to 35 m²/g and a silica having a nitrogen adsorption specific surface area of 40 to 120 m²/g; and zinc oxide,
    wherein
    the inner liner rubber composition has a reclaimed butyl rubber content of 5 to 30 mass % and a combined content of the reclaimed butyl rubber and the halogenated butyl rubber of 70 to 100 mass %, each based on 100 mass % of the rubber component,
    the inner liner rubber composition has a total semi-reinforcing filler content of 3 to 45 parts by mass, a combined content of the carbon black and the silica of 20 to 60 parts by mass, and a content of zinc oxide of 0.8 to 1.8 parts by mass, each per 100 parts by mass of the rubber component.

2. The inner liner rubber composition according to claim 1, which has a tan δ at 70° C. of 0.20 or lower.

3. The inner liner rubber composition according to claim 1, wherein said at least one semi-reinforcing filler is finely ground bituminous coal.

4. The inner liner rubber composition according to claim 1, which contains a quinoline antioxidant.

5. The inner liner rubber composition according to claim 1, which has a phenylenediamine antioxidant content of 0.5 parts by mass or less per 100 parts by mass of the rubber component.

6. The inner liner rubber composition according to claim 1, comprising, per 100 parts by mass of the rubber component:
    1 to 20 parts by mass of a mixed resin and
    1.0 to 1.8 parts by mass of zinc oxide.

7. The inner liner rubber composition according to claim 1, comprising, per 100 parts by mass of the rubber component, 0.1 to 3 parts by mass of an alkylphenol-sulfur chloride condensate represented by the following formula (1):

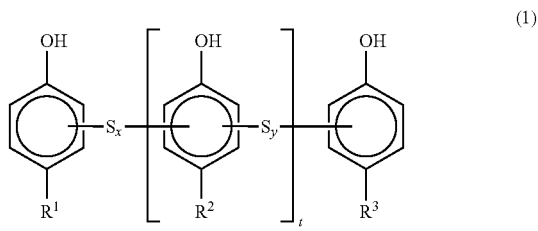

(1)

wherein $R^1$, $R^2$ and $R^3$ are the same as or different from one another and each represent a C5 to C12 alkyl group; x and y are the same as or different from each other and each represent an integer of 1 to 3; and t represents an integer of 0 to 250.

8. A pneumatic tire, comprising an inner liner formed from the rubber composition according to claim 1.

* * * * *